310-335 SR
1/25/83 XR 4,370,662

United States Patent [19] [11] 4,370,662
Hou et al. [45] Jan. 25, 1983

[54] INK JET ARRAY ULTRASONIC SIMULATION

[75] Inventors: Shou L. Hou, Radnor, Pa.; Isao Tashiro, Yokohama, Japan

[73] Assignee: Ricoh Company, Ltd., Tokyo, Japan

[21] Appl. No.: 212,250

[22] Filed: Dec. 2, 1980

[51] Int. Cl.[3] .............................................. G01D 15/18
[52] U.S. Cl. ...................................... 346/75; 310/335; 310/369; 346/140 R
[58] Field of Search ............ 346/75, 140 R; 310/334, 310/335, 369, 371; 417/322

[56] References Cited

U.S. PATENT DOCUMENTS

| | | | |
|---|---|---|---|
| 3,900,162 | 8/1975 | Titus | 346/75 X |
| 4,245,225 | 1/1981 | Fillmore | 346/75 |
| 4,296,417 | 10/1981 | Markham | 346/75 |

OTHER PUBLICATIONS

Fillmore et al., Segmented Crystal Ink Jet Head, IBM TDB, vol. 21, No. 10, Mar. 1979, pp. 3945-3946.

*Primary Examiner*—Joseph W. Hartary
*Attorney, Agent, or Firm*—Guy W. Shoup; Eliot S. Gerber

[57] ABSTRACT

In an ink jet printing apparatus an ultrasonic transducer is an elongated cylindrical assembly submerged in the ink which is held under pressure in an ink chamber. To provide an array of ink jet filaments having uniform length and uniform drop formation, the acoustic energy of the transducer is focused by the internal wall of the ink chamber toward an ink jet array on an orifice plate. The said invention also generates ink droplets from all jets at the same phase—which simplifies the driving electronics of the array for high resolution printing. In one embodiment the internal chamber wall, in cross-section, is a sector of an ellipse and in another embodiment it is a parabola.

23 Claims, 6 Drawing Figures

INK JET ARRAY ULTRASONIC SIMULATION

BACKGROUND OF THE INVENTION

The present invention relates to the generation of drops of ink in an ink jet device, and more particularly to the generation of uniform drops from an array of ink jets.

Ink jet printing is one of the methods of producing visible marks for graphic reproduction on a surface which has received considerable research and development effort. In ink jet printing a stream of water-based ink drops (droplets) is projected toward a surface; for example, the surface may be a moving web of paper. The drops are electrically conductive and are electrically charged by charging electrodes near the streams. The drops may be deflected by electrodes in the course of their movement so as to strike the web in a certain location. Alternatively, in a binary-type print/no-print system the drops may be deflected to either strike the surface or be caught by an ink sump (catcher).

It has been suggested that an array of separated streams of drops may be produced from a single ink chamber (manifold). For example, the array may consist of one or more rows of orifices in a chamber in which the ink is maintained under pressure. The ink flows from each of the orifices in a filament and the filament, at a certain point past the face of the orifice, is broken up into individual drops by stimulation (ultrasonic vibration at a fixed frequency). The breaking up of the filament into drops may be effected by an ultrasonic vibratory mechanism attached to, or within, the chamber. For example, magnetostrictive or piezoelectric transducers may provide the necessary vibrations.

It is desirable that the ink jet array, and the electronic circuitry associated with it, be as simple as possible so as to reduce its cost and provide for reliability. It is desirable, to obtain an accurate marking, that each of the jet filaments which exit from the ink chamber should be as uniform in filament width, length, velocity and phase as possible and that each of the tandem series of drops produced from the filaments should be as uniform as possible. More specifically, it is desired that the mass of each of the drops be the same in each stream; that the filaments break up into drops at uniform distances from the orifices; and that the drops each have the same velocity and same phase, i.e., their velocity should be the same at equal distances from the orifice, and that all drops travel the same distances at any given time and all break up from the filament at the same time.

In U.S. Pat. No. 3,739,393 entitled "Apparatus and Method For Generation of Drops Using Bending Waves," which names Richard Lyon and John Robertson as inventors (hereafter the "Lyon-Robertson patent"), an ink jet system for generating an array of drops is shown which attempts to provide uniformity of the filament length of the ink exiting from the single ink chamber. In the Lyon-Robertson patent a chamber containing water-based ink under pressure has an orifice plate having a number of rows of orifices. The orifice plate is excited by a piezoelectric device so that a longitudinal acoustic wave is traveling along its length and is absorbed at the end of the orifice plate. Hence, there is no reflected acoustic wave to form a standing wave. This traveling wave, as it travels from one end of the plate to the other, causes the ink filaments which are exiting from the orifice plate to break up into drops.

Although Lyon-Robertson's teaching provides acoustic energy uniformly throughout the orifice plate, there exists a phase differential of $2\pi/\lambda \cdot \Delta x$ between adjacent jets, where $\lambda$ is the longitudinal acoustic wavelength and $\Delta x$ is the inter-jet spacing. In other words, at any given time there exists a 180° phase reversal for any two jets separated by a distance of $\lambda/2$. Furthermore, as the acoustic wave travels from one end of the plate to the other, it is attenuated so that the orifices which are further away from the start of the wave receive less acoustic energy than the orifices which are closer to the start of the wave. As a result of the above-mentioned, if we examine the dynamics of droplet generation at any given time, the filament length increases gradually from one end to the other. The location of the first droplet to filament changes by exactly one droplet for every acoustic wave length $\lambda$ away between jets above the orifice plate.

U.S. Pat. No. 4,138,687 entitled "Apparatus For Producing Multiple Uniform Fluid Filaments And Drops," which names Charles Cha and Shou Hou as inventors (hereafter the "Cha-Hou '687 patent") proposes a system to obtain uniform droplets from an orifice plate in an ink jet system. The Cha-Hou '687 patent discussed the Lyon-Robertson '393 patent and pointed out that its traveling acoustical wave presented difficulties in obtaining uniformity in filament length and did not provide uniformity in drop formation. In the Cha-Hou '687 patent a number of pistons are positioned in the back end of an elongated ink jet chamber having a front orifice plate with rows of orifices. The pistons are vibrationally isolated from the chamber. The pistons generate waves which are transmitted to the orifices through the ink fluid with the chamber. The pistons are excited in the same phase and frequency by a set of piezoelectric devices, so that the filaments would have the same length and generate their drops at the same time.

In the Japanese Patent JOP No. 55-65570, issued May 17, 1980, corresponding to U.S. application No. 958,855, a row array of jet nozzles (orifices) is positioned along an elongated chamber. An inner cylindrical member is of metal and the outer tube wall of the chamber is a piezoelectric material. An annular ink cavity is formed between the metal member and the piezoelectric tube. The vibration of the piezoelectric material is normal to the chamber axis and the resulting periodic pressure waves in the liquid cause the break-up of the ink jet filaments into drops. However, the acoustic energy density is inversely proportional to the distance between the orifice plate (piezoelectric tube) and the center (axis) of the chamber. The energy density $E=(r/R)Eo$ where Eo is the density of the acoustic energy generated at the surface of the tube (cylindrical transducer), r is the radius of the tube, and R is the radius of the ink chamber, i.e., the distance from its center axis to the inner tube wall.

OBJECTIVES AND FEATURES OF THE INVENTION

It is an objective of the present invention to provide a continuous ink jet array system (multiple ink jet heads) comprising an ink chamber having a plurality of orifices which form an array of filaments of ink, and a vibratory acoustical transducer in the chamber; wherein the filaments of ink are uniform in length, uniform in velocity, and the break-up points of the filaments, at which the drops are formed, are at uniform distances from the orifices.

It is a further objective of the present invention to provide such an ink jet array system in which the drops formed from the filaments are uniform in mass and uniform in velocity and are formed at the same time (formed in the same phase and same break-up time).

It is a still further objective of the present invention to provide such an ink jet array system in which the acoustic energy of each perturbation reaches all the orifices at the same time (same phase) and with the same amount of energy.

It is a still further objective of the present invention to provide such an ink jet array system in which the ink jet chamber and orifice plate are accurate in shape and yet produced using conventional machinery and technology so as to be reasonable in cost.

It is a still further objective of the present invention to provide such an ink jet array system in which there is a high efficiency of the energy transmitted to the ink filaments from the ultrasonic transducer.

It is a still further objective of the present invention to provide such an ink jet array system in which the ultrasonic transducer, although of a specific shape and configuration, may be produced using conventional technology so as to be reasonable in cost.

It is a still further objective of the present invention to provide such an ink jet array system in which there are relatively few components, so that the system may be readily repaired and may be relatively reliable in operation.

It is a feature of the present invention to provide an ink jet array apparatus for the generation of a plurality of continuous steams of ink drops. The apparatus comprises an elongated ink chamber means having means connecting the chamber to a source of ink under pressure and an ink jet orifice plate. The orifice plate is connected to the chamber as one of its walls and has a plurality of orifices through which the ink is expelled and which form an array of ink jet filaments.

An elongated electro-acoustic ultrasonic transducer means within the chamber converts electrical energy into vibratory perturbations of the ink. Preferably the transducer is a cylindrical piezoelectric transducer having separated tubular segments along a common axis.

The inner walls of the chamber, in cross-section, reflect the vibratory waves toward the orifices. In one embodiment the chamber walls are sectors of an ellipse, the transducer means is positioned at one focus of the ellipse, and the orifices are positioned at the other focus of the ellipse. In another embodiment the chamber wall, in cross-section, is a parabola, the transducer means is at its focus and the orifice plate is perpendicular to its axis.

BRIEF DESCRIPTION OF THE DRAWINGS

Other objectives and features of the present invention will be apparent from the detailed description of the invention, which should be taken in conjunction with the accompanying drawings and which provide the inventor's best mode of operation of the invention. In the drawings.

DETAILED DESCRIPTION OF THE INVENTION

The various embodiments of the present invention described in detail below, and in the accompanying drawings, provide an apparatus for producing a plurality of filaments of ink from a single ink chamber. However, certain of the descriptive material is equally applicable to a single jet head, i.e., a chamber having a single orifice and producing a single stream of drops.

In the various embodiments the inner walls of the chamber are accurately formed to obtain a specified curvature. Generally the curvature is symmetrical about an imaginary central plane of the chamber and is designed so that waves propagated within the ink, which is held within the chamber under pressure, will be reflected towards the orifices. More specifically, the curvature of the inner walls of the chamber will conserve the acoustic energy by reflecting the waves at a focal point at which the orifices are positioned. In addition, it is desirable that the curvature of the inner walls of the chamber be such that the path lengths of the reflected acoustic waves will be equal, regardless of from where on the walls the wave is reflected. The reflected waves, since they have equal path lengths, will arrive at the focal point (the orifice) at the same time, i.e., in the same phase. This chamber structure provides a uniform acoustic energy density at the orifices. If the orifices are of the same size, the filament lengths of the ink ejected through the orifices will be uniform.

The chamber structure will provide that the phase of the acoustic wave at the orifices is the same, i.e., the same across the array of ink jet orifices. Hence, all drops from each ink filament will break-off at the same position (same filament length) and at the same time (same phase). The geometry of the chamber focuses the acoustic energy to the orifice plate. Regardless of the physical dimensions of the ink jet chamber, the electro-acoustic transducer will operate at a reasonable voltage range.

Figure 1:
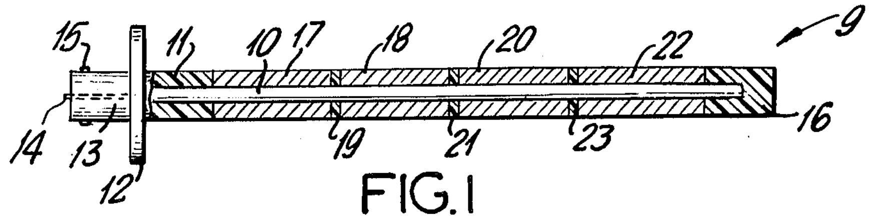
FIG. 1 is a side cross-sectional view of the first embodiment of the ultrasonic transducer assembly, which assembly is part of the ink jet array system of the present invention.

Preferably the piezoelectric transducer utilized in the apparatus of the present invention is an elongated cylindrical member. FIG. 1 shows the first embodiment of a suitable transducer assembly 9. As shown in FIG. 1, an elongated electrically conductive metal rod 10 is cylindrical and round in cross-section. The rod 10 is mounted within the cavity of an insulative end 11 having a flange portion 12. The flange portion 12 is connected to an insulative connector portion 13 having a wire 14 therethrough for the high voltage input and an external conductive ground connection 15. The rod 10 terminates, at its opposite end, in an insulative support 16 having a cavity therein to support the rod.

A series of piezoelectric transducer tubular members, each of which are uniformly and radially poled, are positioned along the length of the rod 10. The transducer tubular member 17 is separated from its neighboring transducer tubular member 18 by an insulative plastic spacer ring 19 such as a suitable Teflon (DuPont trademark) polytetrafluoroethylene plastic. Similarly, the transducer tubular member 18 is separated from the transducer tubular member 20 by the spacer ring 21; and the transducer tubular member 20 is separated from its neighboring transducer tubular member 22 by the spacer ring 23, the spacer rings 21,23 being of the same material and size as spacer ring 19.

The specific dimensions set forth below are intended only as illustration, since the dimensions of the transducer assembly should be particularly adapted for the ink chamber in which it is to be employed. By way of example only, however, the rod 10 may be a stainless steel rod of No. 316 steel with its outer diameter slightly less than the inner diameter of the transducer tubes 17, 18, 20 and 22. Alternatively, the rod 10 may be of brass. The rod 10 acts as the high voltage electrode and is connected to the high voltage input wire 14. The piezoelectric tubular members 17, 18, 20 and 22, which may be segments 1-1.5 cm in length, are nickel-plated both inside and outside, the internal plating serving as a good electrical connection to the rod 10 and the external plating providing a base for its subsequent further plating. The spacers are 1-2 mm thick.

The transducer assembly is assembled by sliding the rod 10 into the bores of the piezoelectric tubular member 17,18, 20 and 22, in that sequence, and with the spacers 19, 21 and 23 inserted between the tubular members. In order to obtain a good coupling, without air gaps, between the rod and the tubular member, a low-temperature solder is melted to fill any gaps between the rod 10 and the inner diameter of the tubular members. Epoxy may be used to replace the low-temperature solder to fill in the gap. Contacts must be made between the inner wall of the transducer and the rod by an extra metallic ribbon or other means. The ends of the rod 10 are then inserted into the end supports 11 and 16. Silicon resin may be used to fill the gaps and to electrically isolate the rod 10 from the ink. The piezoelectric elements and the spacer rings of the transducer assembly are then subjected to a further plating of a thick nickel film on their outside surface to insure a pinhole-free contact with the ink to avoid corrosion and provide an electrical ground connection. The wire (pin) 14 is connected to the rod 10. The electrical ground 15 is connected to the outside nickel film plated on the transducer tubes. An a.c. voltage may then be applied to the input high voltage wire 14. The radially poled piezoelectric tubular elements 17,18,20,22 respond by varying their radial dimensions and thereby generate an acoustic wave within the ink.

Figure 2:
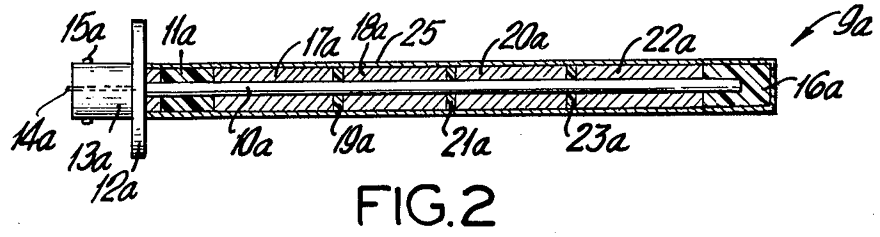
FIG. 2 is a cross-sectional view of the second embodiment of the ultrasonic transducer assembly of the present invention.

An alternative embodiment of the transducer assembly is shown in FIG. 2. Many of the parts are the same and consequently have been labeled with the suffix "a". For example, the high voltage input wire is 14*a*, the ground connector is 15*a*, the flange portion is 12*a*, the connector portion is 13*a*, one insulative end is 11*a*, its opposite insulative end is 16*a*, and the conductive cylindrical rod is 10*a*. Furthermore, preferably this embodiment has a series of piezoelectric tubular members 17*a*, 18*a*, 20*a*, 22*a* separated by plastic spacer rings 19*a*, 21*a* and 23*a*. A thin stainless steel tube 25 is placed on the outer diameters of the piezoelectric tubular members which were Ni-plated and covers those members as well as the spacers 11*a*, 16*a*, 19*a*, 21*a* and 23*a*. For example, the thin wall stainless steel tube 25 may have a wall thickness of 0.005 inch. The stainless steel tube is soldered to the connector ground 15*a*. The tube 25 is pinhole-free so that connection between the stainless steel tube 25 and the outer diameters of the piezoelectric tubular members which may be obtained by filling the gap, with solder or conductive epoxy resin.

The cylindrical electro-acoustical transducer 9 generates acoustic waves through radial vibration of its cylindrical piezoelectric transducer elements. It suppresses the generation of the unwanted longitudinal acoustic wave for a physical length of several acoustic wave lengths. The cylindrical transducer 9 is in direct contact with ink for maximum efficiency of acoustic energy transfer. The transducer assembly may have its transducer elements (the piezoelectric tubular members) completely concealed for maximum reliability.

Figure 5:
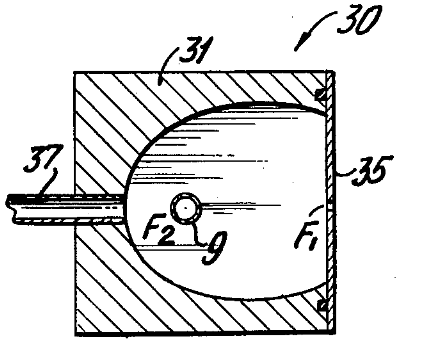
FIG. 5 is an end cross-sectional view taken along the lines 5—5 of FIG. 3.
Figure 3:
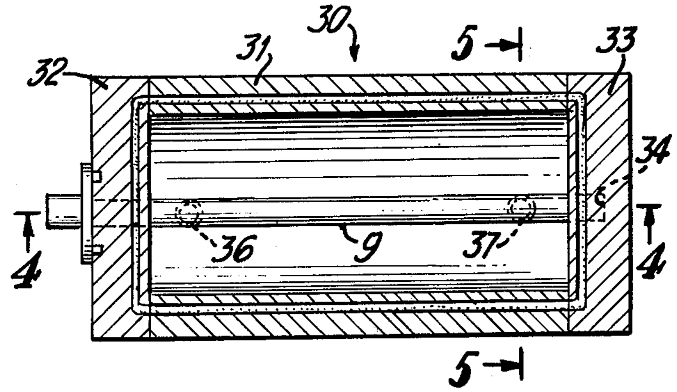
FIG. 3 is a bottom view of the ink jet chamber of the present invention with its cover plate removed.
Figure 4:
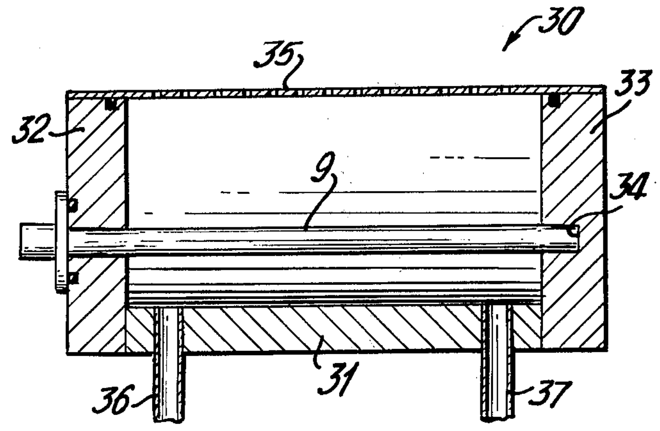
FIG. 4 is a side cross-sectional view taken along the lines 4—4 of FIG. 3.

In the first embodiment of the ink chamber of the present invention, shown in FIGS. 3-5, the ink chamber is constructed so that the inner wall forms an ellipse, it is curved to form an ellipse or is formed with multiple flat surfaces forming an ellipse. If the orifices are in a single row, they are placed at one of the focal points $F_1$. If the orifices are in a series of rows, or other forms of an orifice array, then the orifice plate is at $F_1$ and perpendicular to the major axis, as shown in FIG. 5. In both cases the cylindrical transducer assembly 9 is placed at the other focal point $F_2$ of the ellipse. The acoustic energy emitted from the transducer assembly 9 at focal point $F_2$ will be refocused at the focal point $F_1$ where the orifices are located. The acoustic energy density at the orifices is uniform and almost as strong as that generated at the surface of the transducer assembly 9.

As shown in FIGS. 3-5, the ink chamber 30 is constructed of a material which may have an accurately formed inner wall and which will not react with the ink, suitable materials being No. 316 stainless steel, Plexiglass (TM of Rohm & Haas for an acrylic resin plate) or other organic resin plastics.

The form of the inner wall of the ink chamber 30, in cross-section as shown in FIG. 5, is an ellipse. An ellipse is a locus of a point that moves so that the sum of its distances from two fixed points ("foci" $F_1$ and $F_2$) is constant. The formula for an ellipse is $F_1P+F_2P=2a$, where a is the major axis, b the minor axis, $F_1$ and $F_2$ are the foci, and P is any point on the curve, the sum of the distances to the locus point P from the foci $F_1$ and $F_2$. Its equation, in the XY plane, is $(x^2\ a^2)+(y^2/b^2)=1$. If $c^2=a^2-b^2$ then the foci are $F_1$ (c,O) and $F_2$ (−c,O).

The ink chamber 30 preferably consists of three blocks, a center block 31 and side plate blocks 32,33. The transducer rod assembly 9 is mounted at $F_2$ of side plate block 32 by screws through the flange portion 12 of the transducer. An O-ring seal in a groove within side plate block 31 seals the ink from leaking through the mounting hole. A cavity 34 is drilled in side plate block 33 at $F_2$ so that the outer end of the transducer assembly is tightly positioned within the cavity 34 and supports the transducer assembly, as shown in FIG. 3.

The center block 31 is milled, or otherwise formed, so that the cavity, in side-view as in FIG. 5, is an ellipse. A flat orifice plate 35 is mounted in the imaginary plane passing through the focal point $F_1$ and is perpendicular to the major axis of the ellipse. The imaginary axis of the center of the transducer assembly 9 is at focal point $F_2$ and perpendicular to the plane of the ellipse. At the back of the center block 31 two holes are drilled for the attachment of stainless steel tubes 36,37 for the ink inlet and outlet respectively. The ink inlet tube 36 is connected to a source of ink under pressure. The side plate blocks 32,33 are soldered to the center block 31, or they are sealed or glued if the materials are plastics. The seal, glue, or soldering are water-tight to prevent leakage.

If the orifice plate 35 consists of a single row of orifices, then their centers are located at $F_1$. If the orifices are in a plurality of rows, for example, two or more rows, they are positioned as close to $F_1$ as is consistent with the desired array of ink jets. The orifice plate 35 is attached to the ink chamber by soldering or by pressure clamping using an O-ring seal, as shown in FIGS. 3–5. To avoid acoustic reflections longitudinally, a thin layer of a soft silicone rubber is coated on the inner wall of the end plate blocks 32,33.

Figure 6:
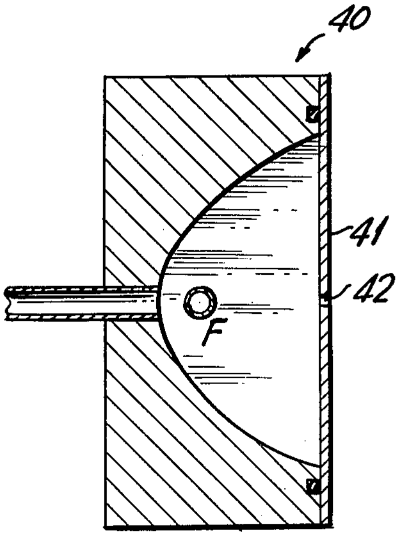
FIG. 6 is a side cross-sectional view of an alternative embodiment of the ink jet chamber.

In the second embodiment of the ink chamber 40, shown in FIG. 6, the inner wall of the ink chamber, in cross-sectional view, is a parabola. The construction of the ink chamber, with its two end plate blocks, formed center block, connected orifice plate and connected inlet and outlet tubes is preferably the same as in the embodiment of the first ink chamber embodiment, shown in FIGS. 3–5.

In the embodiment of FIG. 6 the cylindrical transducer assembly 9 is placed so that its center is at the focal point of the parabola, while the orifice plate is placed some distance away from the focal point F and is perpendicular to the major axis. The acoustic wave emitted from the cylindrical transducer assembly 9 is reflected from the inner wall of the ink chamber and parallel to the major axis. The focusing effect enhances the acoustic energy density at the orifice.

A parabola is a locus of a point which moves so that its distance from a fixed line (the "directrix") equals its distance from a fixed point (the "focus"). The parabola follows the formula in the x-y plane of $y^2=4ax$, where the focus F is at F (a,o). In terms of the directrix the formula is $x^2=2Py$, where x is the abscissa, y the ordinate, and P one-half the parameter (distance from focus to directrix). The formula in polar coordinates is $r=P/(1-\cos\theta)$. In the case of a single row of orifices 42 the orifice row should be located in the plane of the x axis of the parabola. In the case of multiple rows, or other array of orifices, they may be located near the center. The orifice plate 41 is positioned in a plane perpendicular to the x axis of the parabola.

In the embodiment of FIG. 6, by analytical geometry the energy density will be stronger in the center than at the ends.

In both embodiments, it is preferred that an ink filter be installed close to the ink inlet to prevent any possible orifice clogging materials from entering the ink chamber.

Although the curves of the ink jet chamber in the embodiments described above are an ellipse and a parabola, other symmetrical curves may alternatively be employed. Preferably such curves are determined by computer analysis, taking into account the size of the chamber, the size of the transducer means, the phase and angle of each transducer element, the number and distribution of the orifices in the orifice plate, the frequency of the ultrasonic vibrations, the initial strength of the ultrasonic waves, and the desired length and break-up point of the ink filaments. The analysis will be relatively complicated since account must be taken of the resonance phenomena of the ultrasonic waves and the desirability of locating the orifices at the peak of the waves and not at their nodal points. An analogy would be the computer generated curves used in light reflectors, of the type shown in U.S. Pat. No. 3,689,760, incorporated by reference herein, although ultrasonic waves in a fluid are reflected in a more complex manner than are light rays in air.

What is claimed is:

1. An ink jet array apparatus for the generation of a plurality of continuous streams of ink drops comprising:

an elongated ink chamber having means connecting the chamber to a source of ink under pressure;

an ink jet orifice plate connected to said chamber as one of the walls of the chamber and having a plurality of orifices to form an array of ink jet filaments; and an elongated electro-acoustic transducer means within said chamber to convert electrical energy into perturbations of the ink;

wherein the inner walls of the chamber, in cross-section, are sectors of an ellipse, the transducer means is positioned at one focus of said ellipse and the orifices are positioned at the other focus of the said ellipse.

2. An ink jet array apparatus as in claim 1 wherein said transducer is an elongated cylindrical member, round in cross-section, whose central axis is at the said focus of the ellipse.

3. An ink jet array apparatus as in claim 2 wherein the cylindrical transducer comprises a radially poled piezoelectric tubular member and a metal rod through the bore of the tubular member.

4. An ink jet array apparatus as in claim 2 wherein the cylindrical transducer comprises a series of radially poled piezoelectric tubular members, non-piezoelectric tubular separators between the piezoelectric members, and a metal rod through the bores of the piezoelectric members.

5. An ink jet array apparatus as in claim 2 wherein the cylindrical transducer comprises a tubular piezoelectric member which is radially poled and a thin metal tube covering said piezoelectric member.

6. An ink jet array apparatus for the generation of a plurality of continuous streams of ink drops comprising:

an elongated ink chamber having means connecting the chamber to a source of ink under pressure;

an ink jet orifice plate connected to said chamber as one of the walls of the chamber and having a plurality of orifices to form an array of ink jet filaments; and an elongated electro-acoustic ultrasonic transducer means within said chamber to convert electrical energy into perturbations of the ink;

wherein the inner walls of the chamber, in cross-section, are sectors of a parabola, the transducer means is positioned at the focus of said parabola and the orifices are positioned on the central axis of the said parabola.

7. An ink jet array apparatus as in claim 6 wherein said transducer is an elongated cylindrical member, round in cross-section, whose central axis is at the said focus of the ellipse.

8. An ink jet array apparatus as in claim 7 wherein the cylindrical transducer comprises a radially poled piezoelectric tubular member and a metal rod through the bore of the tubular member.

9. An ink jet array apparatus as in claim 7 wherein the cylindrical transducer comprises a series of radially poled piezoelectric tubular members, non-piezoelectric tubular separators between the piezoelectric members, and a metal rod through the bores of the piezoelectric members.

10. An ink jet array apparatus as in claim 7 wherein the cylindrical transducer comprises a tubular piezoelectric member which is radially poled and a thin metal tube covering said piezoelectric member.

11. Apparatus for the generation of a continuous stream of ink drops comprising:

an ink chamber means for containing ink under pressure;

an ink jet orifice plate means connected to said chamber as one of the walls of the chamber and having an orifice through which ink is expelled to form an ink jet filament; and an electro-acoustical ultrasonic transducer means within said chamber to convert electrical energy into perturbations of the ink;

wherein the inner walls of the chamber, in cross-section are sectors of a symmetrical curve having a central imaginary axis and a focus, the transducer means being positioned at the central axis of said curve and the said orifice being positioned at the focus of the said curve;

wherein the vibratory waves in the ink are reflected from the curved walls to be focused at the orifice and arrive substantially in phase at the orifice.

12. Apparatus for the generation of drops as in claim 11 wherein said curve is an ellipse and the transducer means is at one of its foci and the orifice is at the other of its foci.

13. Apparatus as in claim 11 wherein said transducer means is an elongated cylindrical member, round in cross-section, whose central axis is on said axis of the curve.

14. Apparatus as in claim 13 wherein the cylindrical transducer comprises a radially poled piezoelectric tubular member and a metal rod through the bore of the tubular member.

15. Apparatus as in claim 13 wherein the cylindrical transducer comprises a series of radially poled piezoelectric tubular members, non-piezoelectric tubular separators between the piezoelectric members, and a metal rod through the bores of the piezoelectric members.

16. Apparatus as in claim 13 wherein the cylindrical transducer comprises a tubular piezoelectric member which is radially poled and a thin metal tube covering said piezoelectric member.

17. Apparatus for the generation of a continuous stream of ink drops comprising:

an ink chamber means for containing ink under pressure;

an ink jet orifice plate means connected to said chamber as one of the walls of the chamber and having an orifice through which ink is expelled to form an ink jet filament; and an electro-acoustical ultrasonic transducer means within said chamber to convert electrical energy into perturbations of the ink;

wherein the inner walls of the chamber, in cross-section, are sectors of a parabola, the transducer means being positioned at the focus of said parabola and the said orifice being positioned on the central axis of the said parabola.

18. Apparatus as in claim 17 wherein said transducer means is an elongated cylindrical member, round in cross-section, whose central axis is at the said focus.

19. Apparatus as in claim 18 wherein the cylindrical transducer comprises a radially poled piezoelectric tubular member and a metal rod through the bore of the tubular member.

20. Apparatus as in claim 18 wherein the cylindrical transducer comprises a series of radially poled piezoelectric tubular members, non-piezoelectric tubular separators between the piezoelectric members, and a metal rod through the bores of the piezoelectric members.

21. Apparatus as in claim 18 wherein the cylindrical transducer comprises a tubular piezoelectric member which is radially poled and a thin metal tube covering said piezoelectric member.

22. An ink jet array apparatus for the generation of a plurality of continuous jets of ink drops comprising:

an elongated ink chamber means for containing ink under pressure;

an ink jet orifice plate means connected to said chamber as one of the walls of the chamber and having a plurality of orifices through which ink is expelled and which form the array of ink jet filaments; and an elongated cylindrical electro-acoustical ultrasonic transducer means within said chamber to convert electrical energy into perturbations of the ink;

wherein the inner walls of the chamber, in cross-section, are sectors of an ellipse having a central imaginary major axis and a focus, the transducer means being positioned at the focus and the said orifice plate means being positioned perpendicular to the major axis;

wherein the vibratory waves in the ink are reflected from the curved walls to be focused at the orifice plate.

23. An ink jet array apparatus for the generation of a plurality of continuous jets of ink drops comprising:

an elongated ink chamber means for containing ink under pressure;

a flat ink jet orifice plate connected to said chamber as one of the walls of the chamber and having a plurality of orifices through which ink is expelled and which form the array of ink jet filaments; and a cylindrical elongated electro-acoustical ultrasonic transducer means within said chamber to convert electrical energy into perturbations of the ink;

wherein the inner walls of the chamber, in cross-section, is a parabola having a central imaginary axis and a focus, the transducer means being positioned at the focus of said parabola and the said orifice plate being positioned perpendicular to the axis of the said parabola;

wherein the vibratory waves in the ink are reflected from the curved walls to be focused at the orifice plate.

* * * * *